United States Patent Office 3,335,127
Patented Aug. 8, 1967

3,335,127
FRACTIONATION OF MIXTURES OF AGAROSE AND AGAROPECTIN
Alfred Polson, Milnerton, Republic of South Africa, assignor to South African Inventions Development Corporation, Scientia, Pretoria, Transvaal, Republic of South Africa, a corporation of the Republic of South Africa
No Drawing. Filed Aug. 5, 1964, Ser. No. 387,777
Claims priority, application Republic of South Africa, Aug. 14, 1963, 3,696/63
17 Claims. (Cl. 260—209.5)

This is a continuation-in-part of my pending patent application Ser. No. 246,000 filed on Dec. 20, 1962, and which by reference thereto is to be considered as forming part of the present disclosure.

The present invention relates to the fractionation of mixtures of agarose and agaropectin, in particular to the fractionation of agar.

C. Araki (J. Chem. Soc. Japan, Pure Chem. Sect., 58 (1937)), 1338, has shown the presence of two main fractions in agar, a neutral, substantially sulphate-free, linear, galactose polymer, referred to as agarose and a sulphated polysaccharide referred to as agaropectin. Since then the terms agarose and agaropectin have been used regularly side by side in the literature (cf. Araki, Bull., Chem. Soc. Japan, 129 (1956), 543; Araki in Wolfrom, Carbonhydrate Chemistry of Substances of Biological Interest, 4th Intern. Congr. of Biochem, Vienna, 1958, vol. 1, Permagon Press, London, p. 15, and particularly Hjerten Biochim. Biophys. Acta, 62 (1962), 445–449, in which the substances are described as well-defined polysaccharides and in which details of their respective structures are given).

Natural agar or agars purified by various industrial processes are predominantly mixtures of agarose and agaropectin, each of which may in turn be considered a mixture of molecules of varying molecular weight and probably also of variable sulphate content in the case of agaropectin.

It is an object of the invention to provide a process of fractionating such mixtures as defined above and in particular to separate the agarose group of substances from the agaropectin group of substances in such mixtures.

Further objects of the invention will become apparent from the following more detailed description in which various applications and uses of the invention are referred to in their context.

A process in accordance with the invention for fractionating mixtures of agarose and agaropectin comprises treating such mixture with an aqueous liquid containing dissolved or dispersed therein polyethylene glycol having a molecular weight of at least 300 in such concentrations as to render parts of the said mixture insoluble or indispersable in the aqueous liquid and separating the resulting insoluble or indispersable fraction from the aqueous liquid containing the balance of the said mixture dissolved or dispersed therein.

In doing so it is found that agarose is preferentially rendered insoluble or indispersable in the aqueous liquid containing the polyethylene glycol, whilst the proportion of agaropectin dissolved or colloidally dispersed in the aqueous liquid is higher than in the original mixture.

In accordance with the preferred process, the mixture to be fractionated is first substantially dissolved or colloidally dispersed in the aqueous liquid, whereafter polyethylene glycol is added in an amount suitable to precipitate agarose selectively from said mixture.

Advantageously the process is carried out at a temperature at least as high as ordinary room temperature and preferably above ordinary room temperature, e.g. above 40° C.

Advantageously the process is carried out by bringing the said mixtures, while in aqueous colloidal solution, into admixture with polyethylene glycol of sufficient concentration in relation to its molecular weight to precipitate agarose and at a temperature above the gelling temperature of the colloidal solution and below the temperature at which substantial degradation of agarose occurs within the period at which it is subjected to said temperature, thereby producing a precipitate in which the ratio of agarose to agaropectin is higher than in the original mixture and a residual liquid colloidal dispersion in which the ratio of agarose to agaropectin is lower than in the original mixture and separating the precipitate from the said residual dispersion. At lower temperature the solution or dispersion might start gelling while still being processed, and even incipient gelling was found to have an adverse effect on the fractionation.

Preferably the fractionation is carried out at a temperature above 60° C. We have found that at lower temperatures, say, between 50° and 60° C. the agaropectin tends to precipitate to an increased extent, together with the agarose. At higher temperatures the fractionating power of the precipitant is improved. At temperatures below 40° C. the colloidal solutions tend to solidify and in solutions of high concentration the gelling temperature can be even higher than 40° C. High temperatures have the additional advantage of reducing the viscosity of concentrated colloidal solutions and this factor may be utilised to treat colloidal solutions more concentrated than would be possible at lower temperatures.

At present we prefer to carry out the treatment between 70 and 100° C., more particularly at least initially 80° C. to 90° C., which we found to give particularly good results. In fact in most cases the preferred initial precipitation temperature is essentially at 90° C., at which temperature precipitation is almost instantaneous.

After precipitation and before separation of the precipitate from the mother liquor the temperature is preferably allowed to drop to between 60 and 80° C., say 70° C., during which cooling down period the precipitate settles out and assumes a firmer consistency.

Agarose is unstable at high temperatures, which fact has a bearing on the choice of an upper temperature limit. On the other hand high temperature degradation is also a function of time, and accordingly it is not unfeasible to carry out the process at high temperatures even above the boiling point of water if carried out under pressure provided the treatment is carried out so rapidly that the degradation of agarose is negligible. Such high temperatures might be chosen if it is desired, e.g. for economic reasons, to treat colloidal solutions of such high concentration that they would be too viscous for treatment at lower temperatures.

In this context it is important to bear in mind that the reversable precipitation to which this invention relates is not an ordinary chemical precipitation reaction. In this process the precipitation or not of a particular substance depends entirely on the concentration of polyethylene glycol in the reaction mixture and not on the molar ratio in which the precipitant and the substances to be precipitated are present.

Polyethylene glycol is available in grades having various average molecular weights.

Polyethylene glycol having an average molecular weight in the range 300 to 100,000 was found suitable for the process. A pronounced improvement is obtainable if the polyethylene glycol has a molecular weight of at least 600, and not more than 20,0000. Products having average molecular weights between 1,500 and 10,000 were found to be more suitable. Most of our experiments were carried out with polyethylene glycol having molecular weights in the range between 4,000 and 8,000, more particularly 6,000, with particularly good results.

Improved results are as a rule attainable with polyethylene glycol composed of molecules, the molecular weights of which are essentially within a narrow range by comparison with the total ranges as specified in the preceding paragraph for the average molecular weights.

An upper limit is generally imposed on the molecular weight of the polyethylene glycol by the fact that at the concentration and temperature employed the viscosity of the resulting solution must still be low enough for a precipitate to be separated therefrom by centrifugation or other means. Polyethylene glycol available from different sources may differ in properties relevant to the present process. Agar of different types or from different sources may also have widely varying characteristics, for which reason preliminary experiments are recommended to determine the optimum conditions for a fractionation in each particular case. For this purpose and for purposes of process control we recommend the determination of an arbitrary "precipitation index" in a manner analogous to that described in our co-pending application Ser. No. 246,000.

Polyethylene glycol having a comparatively low molecular weight, say between 600 and 1,500, both inclusive, may in some cases be found more advantageous than a precipitant of higher molecular weight, because the precipitant may be more easily removed from the products of the fractionation after the fractionation has taken place.

Polyethylene glycol has the advantage of ready commercial availability and of being obtainable at almost any desired molecular weight at reasonable cost. Difficult fractionation or purification problems may be solved by repeated alternate precipitation and dissolution or redispersion. Consecutive precipitations may be carried out under different conditions, e.g., with regard to the molecular weight of the polyethylene glycol.

If desired or required, the fractionation may be carried out in several stages, e.g. by a stagewise increase in the polyethylene glycol concentration and the removal of precipitated material between successive increases in concentration.

Other variables which may influence the degree of precipitation and selective repression of solubility or dispersability are temperature and ionic strength of the aqueous liquid.

In general the effect of the polyethylene glycol is completely reversable, for which reason it is feasible to achieve fractionation not only by fractional precipitation but also by the reverse process of redissolving or redispersing whilst the solubility or colloidal dispersibility of part of the mixture is selectively repressed by the presence of an appropriate concentration of polyethylene glycol in the aqueous liquid. In my co-pending application Ser. No. 246,000 we describe a suitable procedure applied to different fractionation problems. Essentially the same procedure of selective redispersion may be applied to the fractionation of agarose and agaropectin in a manner which will be readily understood without further discussion. At present fractional precipitation appears to be more attractive commercially, for which reason we place more emphasis on precipitation in this disclosure.

In carrying out a fractional precipitation in the process in accordance with the invention it is found advantageous if a predetermined ratio of polyethylene glycol and aqueous solution or dispersion of the mixture to be fractionated is brought into admixture rapidly, more particularly within a period of 10 minutes. For example, to obtain the best results, the polyethylene glycol is admixed at a rate of at least 4 kg. per minute per 50 litres of solution. The polyethylene glycol may also be added to the aqueous solution or dispersion of the mixture of agarose and agaropectin co-currently.

The precipitates formed by the process are on the whole particularly easy to handle, particularly if the solution after the admixture of the polyethylene glycol is maintained under conditions of gentle agitation before separating the precipitate from the solution for a suitable period of time.

Polyethylene glycol may be removed from the fractions by extraction with a suitable solvent, e.g. chloroform.

Using polyethylene glycol of molecular weight 6,000 we found consistently that in the majority of cases a concentration of 80 g./l. was adequate for a virtually complete precipitation of agarose, regardless of the concentration of agar or agarose in the solution being treated. After the precipitate had been removed it was invariably found uneconomical to increase the concentration of polyethylene glycol in the mother liquor with a view to increasing the yield of precipitate. However, the above values are subject to the qualifying remarks further below.

As mentioned before, it is usually found advantageous for economic reasons to bring the mixtures to be treated into aqueous colloidal solutions of high concentration. Generally speaking the concentration should be such that the colloidal solution will still flow readily (at least once the precipitate has formed) which, as mentioned before, is also a function of temperature.

According to one embodiment the polyethylene glycol is itself brought into aqueous solution before it is brought into admixture with an aqueous colloidal solution of the mixture to be treated.

According to another preferred embodiment the essentially pure polyethylene glycol, e.g. in flake form, is brought into admixture with the aqueous colloidal solution to be treated. This is done with agitation. This procedure is possible because the precipitation process is completely reversable. Accordingly a precipitate forming as a result of localised excessive polyethylene glycol concentration during the formation of the reaction mixture will partly or wholly redissolve until equilibrium is restored.

According to one embodiment of the invention a very highly concentrated colloidal solution of agar say, at least of 10% (this concentration can easily be obtained with agar of low gel strength), heated to say 100° C. to reduce its initial viscosity is stirred into a concentrated solution of polyethylene glycol, say of 40% concentration w./v. and maintained at say 80° C. As soon as agarose begins to precipitate the viscosity of the reaction mixture drops. Solution is added until the desired final concentration of polyethylene glycol is obtained. If desired, more concentrated solution of agar may be added to the reaction mixture and the deficiency of polyethylene glycol corrected from time to time by the addition of further polyethylene glycol, e.g. in the pure form or in the form of a concentrated aqueous solution. This procedure will be feasible provided the ratio between agaropectin and agarose is small. The ratio agaropectin/agarose as evidenced by the electroendosmosis varies from batch to batch of agar.

When one precipitation step produces incomplete fractionation, the fractionation may be carried out stagewise both with regard to the precipitation as well as with regard to the residual colloidal liquid phase. Fractional precipitation may be carried out by continually or in stages increasing the precipitant concentration in the reaction mixture. On the other hand any precipitate formed may be re-dissolved and re-precipitated as many times as desired or required for further fractionation or purification.

In this context it should be remembered that the substances agarose and agaropectin are inhomogeneous and variable, especially with regard to molecular weight, and probably also in regard to sulphate content.

The high molecular weight substances of each group are more readily precipitated (that is, at lower polyethylene glycol concentrations) than corresponding members of the same group having lower molecular weight. It must, therefore, be borne in mind that some low molecular weight members of the agarose group will almost invariably be precipitated together with some high molecular weight members of the agaropectin group when occurring together in mixtures.

Generally speaking the process in accordance with the present invention is applicable to the fractionation or purification of natural agars from various sources and pre-purified to various degrees. Crude agars extracted from seaweed are suitable for processing. If desired, the aqueous extracts from seaweeds may be processed immediately after prior filtration.

The product recovered in the precipitate is enriched in respect of agarose so as to serve as a "purified" agar of superior properties, or in the extreme case the product recovered from the precipitate may be agarose of considerable purity.

The process may be controlled to result in precipitates yielding products of controlled gel strength, e.g. as a result of the polyethylene glycol concentration at which precipitation was carried out. At the lowest concentrations only agarose of highest molecular weight will be precipitated. Such agarose generally has the highest gel strength. For purposes of process control the gel strength may be determined as described further below in the examples.

Stepwise fractionation will result in fractions of different gel strengths. The first precipitate formed at a low polyethylene glycol concentration will have a very high gel strength as a rule. Stepwise increasing of the polyethylene glycol concentration results in the precipitation of fractions of decreasing gel strength.

The agarose obtainable by means of this process can be produced to have a gel strength much superior to untreated agar and in this respect we found agarose produced by the method in accordance with the present invention very often to be very much superior to agarose produced by the known acetylation method. However, the products of the process may also serve as chemical "specialities" for purposes where gel strength is not necessarily of predominant importance.

In those cases where the precipitate is subjected to repeated dissolution and reprecipitation, it is possible to carry out the treatment in countercurrent for improved efficiency and more economical utilisation of the precipitant.

Separation of the precipitate from the mother liquor may be carried out by filtration, e.g. through stainless steel gauze of 150 mesh A.S.T.M. One run is usually sufficient, but occasionally two runs may be needed. The precipitate is washed with a hot solution of polyethylene glycol.

As an accurate means of process control we may employ a determination of the sulphur content as a measure of the purity of the precipitated agar. Use is made of the generally held assumption that at least the bulk of any sulphur present is attributable to agaropectin and that pure agarose is free or almost free of sulphur. Considerable difficulties were initially experienced with the sulphur determination and a suitable method is described further below in the examples.

From the residual colloidal liquid obtained after the precipitation of agarose an agaropectin product depleted or essentially freed of agarose may also be obtained as a further product. This may be achieved by cooling the colloidal solution below 20° C. preferably below 10° C., say to 5° C., and mixing the solution with acetone in a ratio of at the most 2 parts of solution per 1 part of acetone, preferably approximately equal volumes of solution and acetone to precipitate agaropectin. Preferably the reaction mixture is then heated moderately, e.g. at 50° C. for 5 minutes (preferably on a water bath) to assist the settling of the precipitate.

The agaropectin precipitate may be separated from the mother liquor by decantation and is preferably freed of polyethylene glycol by solvent extraction, e.g. by extraction with chloroform and subsequent water washing. Such washing is preferably continued until the trichloroacetic acid test for polyethylene glycol is negative. The product may then be dehydrated, e.g. with acetone, and dried in warm air.

The presence of electrolyte during the precipitation of agarose is advantageous because it assists in the flocculation of the precipitate. Crude agar will usually contain sufficient electrolyte (e.g. in the form of calcium salts and agaropectin which is itself an electrolyte) for satisfactory flocculation. However, when required, in particular during any re-precipitation of the precipitate, it is advantageous to add electrolyte to the reaction mixture, e.g. in the form of sodium chloride, e.g. enough to result in a final concentration of 0.5% w./v. of NaCl, or more.

It was also found that sodium chloride advantageously lowers the viscosity of the agar solution, raises the upper practical limit of the agar concentration and raises the yield as well as the sulphur content.

It was further found that acidification, more particularly wih acetic acid, say in a concentration of between 0.05 and 0.5 molar, more particularly 0.1 molar lowers the viscosity, thereby raising the upper practical limit of the agar concentration and results in a modification of the final product (apparent from a lowered gel strength without any noticeable difference in sulphur content). The yield is increased. Depending on the type of product which is desired, this discovery may be put to practical use.

The above-mentioned preferred processing conditions were found to hold true for a considerable number of batches of material. Nevertheless the mixtures serving as a starting material, that is, natural agars of various degrees of purity are so variable, even if obtained from one supplier, that preliminary tests should be made on each new batch to establish the optimum concentration of polyethylene glycol, and other optimum conditions for a particular purpose. In most cases a reasonably complete precipitation of the agarose is aimed at with as little agaropectin contamination as possible. In our experience the lowest polyethylene glycol concentration for this purpose has varied for different batches between 7% and 20% w./v. (M 6000). Thus it was found that 7% w./v. of polyethylene glycol (M 6000) was sufficient to precipitate agarose from agar derived from *Gelidium pestoides*, whereas some commercial samples of agar, e.g. Ion Agar No. 2 (Oxoid) in some cases required 20% w./v. for the desired results.

The optimum concentration can be determined by simple routine laboratory tests, in which the amount of precipitation at different polyethylene glycol concentrations is measured. Furthermore in addition to the sulphur determination referred to above, the precipitate may be subjected to simple laboratory tests to estimate the contamination with agaropectin. We recommend one of the following tests for this purpose:

(a) The estimation of sulphates (agaropectin being a sulphate compound). A suitable procedure is described further below; and (b) Electroendosmosis measurements for which a suitable procedure is also described below. Pure agarose has an extremely low electroendosmosis whereas contamination with agaropectin results in an increased electroendosmosis.

The partly or wholly purified agarose, which can be produced by means of the process, is suitable (depending on the degree of purification) for bacterial culture media (very high gel strength) electrophoresis, gel diffusion filtration and as an overlay for virus plaque formation.

For rendering the agarose produced by the process even more suitable for virus work the purified material is preferably subjected to electrophoresis, e.g. for 72 hours at a D.C. voltage of, say, between 5 and 10 volts per cm. This purification purification step removes all ionic impurities.

One possible application of agaropectin purified by the present process may be as an ion exchanger.

When desired or required polyethylene glycol used in the process as a precipitant may be recovered from the residual aqueous liquid, e.g. by solvent extraction, more particularly by extraction with chloroform.

Further features of the invention will be described in the following by way of example.

*Example 1.—Preparation of agarose from a batch requiring 20% w./v. of polyethylene glycol for adequate precipitation*

Agar (80 g.) is stirred mechanically with distilled water (2 l.) on a boiling water bath until completely dissolved. To the solution at 80° are added 2 litres of 40% w./v. polyethylene glycol M 6000 also at 80° and the whole is mixed well. Within 3–5 minutes a flocculent precipitate settles to the bottom of the containing vessel. The precipitate is separated from the supernatant fluid by filtration through 110 mesh nylon cloth and is immediately placed, still inside the cloth, in a basin containing water at 40°. Most of the agaropectin remains in the mother liquor and more is removed by washing at 40°. It is, however, important not to wash at 40° for more than 2–3 minutes as the precipitate itself is soluble at this temperature. Alternatively the agarose precipitate may be collected and washed in a prewarmed basket centrifuge lined with nylon cloth. The nylon bag containing the precipitate is then transferred to water at about 15° in which it is thoroughly washed and the larger pieces broken up. Most of the remaining polyethylene glycol is removed by stirring the precipitate in 5 l. of distilled water overnight. The washed granules are collected in 110 mesh nylon cloth either in a basket centrifuge or Buchner funnel, washed with acetone and dried in a current of warm air. The product is weighed, dissolved in distilled water at 100° to form a 4% w./v. solution, reprecipitated with polyethylene glycol and washed and dried in the same way. A third precipitation is usually necessary to ensure complete removal of agaropectin. Sometimes, especially at the second and third precipitation stages enough sodium chloride to give a final concentration of 0.5% must be added after the polyethylene glycol to flocculate the agarose in a form suitable for collection. The final product is stirred overnight with distilled water (5 l.) collected and washed with water on a nylon cloth in a basket centrifuge, ground in a mortar, stirred again overnight with water, centrifuged, washed with acetone and dried in warm air. No polyethylene glycol should be detectable by the addition to a few drops of the final agarose washings of an equal volume of a saturated solution of trichloracetic acid. A yield of 60–70% of partially purified agar is obtained after the first precipitation. The final yield of agarose varied between 30% and 45%.

The quantities indicated above have been found satisfactory for one batch of Ionagar No. 2 but it must be stressed that these will vary for agars derived from different sources and even for different batches of the same product. Thus it has been found that 7% w./v. of polyethylene glycol was sufficient to precipitate agarose from agar derived from *Gelidium pestoides*. The product thus obtained was found suitable for electrophoresis, gel diffusion-filtration and as overlay for virus plaque formation. As, however, commercial agar seldom forms completely clear aqueous solutions, we have on occasion clarified initial 1% or 2% solutions before addition of polyethylene glycol by passing them at about 5 l./hour through the clarifying bowl of a Model 1 A.P. Sharples centrifuge driven by steam turbine at 40,000–50,000 rev./min. The machine was heated by passing steam through the coils normally used for refrigeration and the fluid entered through a small Liebig condenser with steam in the jacket.

Sulphate contents of 0.75%, 0.78% and 1.1% were found in Ionagar No. 2 (Oxoid) on different occasions but no sulphate was detectable by the method used in two batches of agarose.

*Example 2.—Preparation of agaropectin*

Agaropectin may be separated from the supernatant fluid of the first precipitate obtained in accordance with Example 1. The solution is cooled to 5° and mixed with an equal volume of acetone. A fine white precipitate of agaropectin is formed which settles to the bottom of the containing vessel when the mixture is heated in a water bath at 50° for 5 mins. The mother liquor is decanted and the agaropectin shaken with chloroform in a separating funnel to remove most of the polyethylene glycol and then washed with water by stirring until the trichloracetic acid test for polyethylene glycol is negative. The product is dehydrated with acetone and dried in warm air.

*Example 3.—Purification of Gelidium agar*

Gelidium agar in a very impure form is dissolved at 96° C. to the extent of 2% in water. Rapid stirring reduces the time taken for the agar to dissolve. 7% dry polyethylene glycol is stirred in rapidly while the solution is at a temperature above 80° C. A fine precipitate is formed which flocculates on the addition of 1% sodium chloride. A heavy semi-solid mass settles out. The supernatant fluid is decanted and the heavy mass is filtered off on a 30 mesh sieve to remove the remaining fluid. On cooling, the semi-solid mass hardens to a stiff gel. This is disintegrated in a meat grinder, redissolved in distilled water and reprecipitated with 7% polyethylene glycol. The process is repeated a third time after which the product is dehydrated with acetone and dried. The final product shows no electroendosmosis.

*Example 4.—Preparation of agarose from Spanish agar*

40 g. of Spanish agar were dissolved in 1500 ml. water containing 15 g. NaCl. At 90° C. 120 g. of polyethylene glycol (M. wt. 6000) in flake form were added with agitation and a precipitate formed immediately. The batch was allowed to cool down to 70° C. and then filtered through 150 mesh ASTM stainless steel gauze. The precipitate was washed with hot 8% w./v. aqueous polyethylene glycol solution. The sulphur content in the original mixture had been 2.337%, that of the precipitate was 0.381%.

The precipitate was redispersed in 1500 ml. water containing 1% NaCl and the precipitation with 8% w./v. polyethylene glycol was repeated as before.

The precipitate was washed with 8% polyethylene glycol, allowed to harden somewhat in the semi-dry state and shredded. The shreds were thoroughly washed by stirring in distilled water for three periods of one hour each and finally for a period of 20 hours. They were then washed with ethanol, followed by washing with ether (acetone may be used instead of ether). Finally they were dried in an oven at 110° C. for about 10 hours. (In a repeat experiment it was found that drying at a much lower temperature in a vacuum oven improves the quality.)

The yield was 38% and the sulphur content had been further reduced to 0.2316%.

*Example 5.—Preparation of agarose from Spanish agar*

Example 4 was repeated with a greater number of reprecipitations.

This time the sulphur content after two precipitations had dropped to 0.2220% and after three and four precipitations amounted to 0.2021% and 0.2010% respectively.

*Example 6.—Preparation of agarose from Spanish agar*

Example 4 was repeated in 2% NaCl solution. After two precipitations the yield was 48.5% and the sulphur content 0.314%.

*Example 7.—Preparation of agarose from Spanish agar*

Example 4 was repeated in 6.7% NaCl solution. After two precipitations the yield was 64.9% and the sulphur content 0.368%.

The gel strength of the original agar had been 300–310. That of the precipitate was 470. When repeated the results were: Yield 66.9%, sulphur 0.379%.

*Example 8.—Preparation of agarose from Spanish agar*

Example 4 was repeated in 3.3% NaCl solution. After two precipitations the yield was 56.2% and the sulphur content 0.336%.

*Example 9.—Preparation of agarose from Spanish agar*

Example 8 was repeated with an agar concentration increased by 50%, i.e. to 60 g. per 1500 ml. solution. Filtration was possible but difficult due to an increased viscosity. The yield was 67.2%, sulphur content 0.370%.

*Example 10.—Preparation of agarose from Spanish agar in the presence of acetic acid*

50 g. agar were dissolved in 1500 ml. 0.1 M acetic acid (pH 2.9). At 90° C. five amounts of 10 g. agar were added at 5 minutes intervals. The liquid was of much lower viscosity than usual and still more agar could have been added. Here the yield was 44.2% and the sulphur content 0.213%; pH first filtrate 3.3. The gel strength had dropped to 205.

*Example 11.—Determination of gel strength for purposes of process control*

The gel strength is determined as follows: Weigh off enough agar(ose) to contain exactly 10.00 g. of dry substance (a moisture determination is needed here).

Put the powder into a 600 ml. beaker; add (500 g. of agar) ml. of distilled water, so as to make total weight of agar+water=500 g. Weigh beaker+agar+water=A g. Heat in a water-bath to 91–92° C. and keep it at that temperature for 10 min., stirring from time to time. Cover beaker with watch-glass. Take beaker out of water-bath, allow to cool down to ±50° C., weigh again, replace evaporated water so as to adjust the weight again to A g., pour into a Petri dish (dia. 2¾"), cover with a glass cover and allow to stand overnight. Next morning let steel bar+platform rest on the surface of the gel in the Petri dish, put a beaker on top of the platform and add so much water that the bar breaks through the gel between ½ and 1 minute after commencing.

The total weight of the bar, platform, beaker and water represents the gel strength, as the bar has a cross-section of exactly 1.00 cm.$^2$ (dia. 1.12 mm.).

*Example 12.—Estimation of sulphate as a measure of agaropectin content for purposes of process control*

Sulphate was estimated by the method of K.S. Dodson and R.G. Price, Biochem. J., 84 (1962), 106, modified for use with a turbidimeter. Leaf gelatin (2 g.) was dissolved in water (400 ml.) at 60°–70° and the solution, after standing about 48 hours at 4° was treated at room temperature with barium chloride dihydrate (2 g). After a night at 4° the cloudy solution was centrifuged for one hour at 10,000 rev./min. in the Spinco No. 30 rotor at room temperature. The clear supernatant, treated with thiomersal (0.01%) appeared stable for many weeks. Standards were prepared containing in 0.2 ml. 10, 20, 30, 40, 50, 60, 70, 80, 90 and 100 μg. SO$_4$. Test mixtures containing 0.2 ml. standard (or 0.2 ml. H$_2$O for the blank) 0.2 ml. 1 N HCl, 0.3 ml. 1 N sodium acetate, 3.3 ml. H$_2$O and 1 ml. of the gelatin-BaCl$_2$ solution were examined in the turbidimeter at known time intervals after preparation. The turbidimeter was the light scattering apparatus of G. Oster, J. Gen. Physiol., 33 (1950), 445, modified as described by T. H. Mead, J. Gen. Microbiol., 27 (1962), 397, and consisting essentially of a square polymethylmethacrylate cell illuminated by a narrow pencil of light. A photomultiplier cell at right angles to the incident beam measured light scattered by any particles in the cell contents. For these experiments the galvanometer was set to zero with the blank in the cell and to 100 divisions with the standard containing 100 μg. SO$_4$. Readings were taken about 20 mins. after addition of the gelatin-BaCl$_2$ solution and usually repeated (after the samples had been shaken) on the following day with similar results. Galvanometer readings plotted against μg. SO$_4$ gave a straight line in the 40 μg.–90 μg. range.

The agar and agarose samples (about 20 mg.) were hydrolysed in sealed tubes with 1.0 ml. amounts of 1 N HCl at 105° for 5 hours. The tubes were centrifuged briefly to compact the humin before being opened. In a preliminary experiment 0.2 ml. hydrolysate and 0.2 ml. H$_2$O replaced the standard and the 1 N HCl in the test mixture. In subsequent assays of each hydrolysate, mixtures of 0.1 ml. or 0.2 ml. hydrolysate+2 ml. of one or more of the standards were set up in a series which also included the standards in the 40–90 μg. range. In this way the turbidity of the sample was compared with that of the standards at several levels in the range in which μg. SO$_4$ and galvanometer readings were linearly related.

*Example 13.—Electroendosmosis measurements suitable as a relative measure of agaropectin content for purposes of process control*

Method A.—Rabbit serum was submitted to electrophoresis in the agar or agarose sample at pH 8.2 under standard conditions and the direction and extent of migration of the gamma globulin and proteins was taken as a measure of electroendosmotic flow. The electrophoresis was carried out on microscope slides resting on the water cooled (10°) floor of an enclosed polymethylmethacrylate apparatus. Strips of filter paper carried the current between the electrode vessels and the slides. Buffer prepared according to P. Grabar and C. A. Williams, Biochem. Biophys. Acta, 17 (1955), 67, by mixing a 0.1 M solution of sodium diethylbarbiturate (770 ml.) with 0.1 N HCl (230 ml.) was used in the electrode vessels and paper strips and buffer of half this concentration for preparing the slides which carried 2.5 ml. of 1% solution of the agar to be tested. The serum was placed in a hole about 1.0 mm. in diameter at the mid point of the slide and electrophoresis was continued for 1 hour at 10 volts/cm. The slides were immersed for 10 mins. in a fixing solution containing in 500 ml. HgCl$_2$ (2 g.), acetic acid 10 ml. and ethanol 300 ml. They were stained in naphthalein black or nigrosin.

Method B.—This was carried out in the same way except that a 1% w./v. aqueous solution of polyethylene glycol was used in place of rabbit serum. After electrophoresis the slide was immersed in 15% trichloracetic acid for about 10 mins. This revealed the final position of the glycol by the formation of a white spot.

*Example 14.—Determination of sulphur in agar and agarose found suitable for purposes of process control*

Of a number of alternatives tried, the following method was eventually selected as most suitable. The method has two phases: (a) digestion of the agar(ose) (b) precipitation of PbSO$_4$ and titration of excess Pb(NO$_3$)$_2$.

(a) For the digestion a modified version was used of "Sulphur in Plant and Animal Tissues" (J. Agr. Food Chem., 1959, p. 844).

Weigh a sample (agar: about 0.25 g., agarose: about 1 g.).

Transfer sample to a 100 ml. Kohlrausch borosilicate glass flask. Wash down with 10 ml. of equal parts of nitric acid conc. and 70% perchloric acid. Swirl the contents till the material is completely wetted and in suspension.

Heat Kohlrausch flask in a sand-bath on a hotplate initially switched on at full heat with the bottom of the flask touching the bottom plate of the tray. Cover flask with hot sand up to 2″ deep.

Maintain the digestion at active but not excessive boiling, by regulating the heat, e.g. by means of a variable transformer. Continue until white vapour appears.

Maintain boiling for one hour after the digested solution has assumed a pale greenish-yellow colour.

Swirl the contents twice at 20 minute intervals.

Remove the flask from the sand tray, transfer to a beaker and heat to boiling temperature for 15 minutes (add a few glass pearls).

Filter off insoluble matter and wash out with hot distilled water.

In order to save acetone in the next step (the volume of acetone used is three times the volume of the watery solution containing the sulphate) it is advisable to evaporate about ⅔ of the water of the filtrate before proceeding to the analysis.

(b) Precipitation of $PbSO_4$ and titration of excess $Pb(NO_3)_2$:

(1) *The solution*—Make up a solution of approximately 0.01 Molar $Pb(NO_3)_2$. M.W.: 336.222. Solution A. Make up a solution of approximately 0.01 Molar EDTA (disodium-ethylene-tetra-acetic acid, $4H_2O$) M.W.: 331.23. Solution B. Make up a solution of exactly 0.01 Molar $Na_2SO_4$. M.W.: 142.060. Solution C.

(2) *Determine the relative titres of solutions A and B*—From a buret run 15.00 ml. of A into a 250 ml. Erlenmeyer flask. Add 5 ml. of perchloric acid (as this is also present in the digested solution). Add 15 ml. of 4 N NaOH. Adjust pH to 5.4 with $NH_3$ conc., $NH_3$ diluted 1:20, and $HNO_3$ diluted 1:20. Add a knifetip (0.2–0.3 g.) of hexamethylenetetramine crystals (buffer). Add a knifetip of the indicator xylenol-orange; keep the colour rather faint. If the colour is pink adjust the pH back to 5.4; the colour is then orange-yellow. Titrate back with solution B till one or two drops cause the colour to veer from orange-yellow to *plain* yellow. Calculate the relative strengths of A and B.

(3) *Determine the absolute titres of solutions A and B*—Into a 600 ml. beaker pour 5 ml. perchloric acid 70%, 10 ml. 4 N NaOH. From a buret run 10.00 ml. of solution C. Here the pH must be below 1 for a good formation of the $PbSO_4$ (check with pH paper if possible). Heat to about 60° C. From a buret run in slowly 20.00 ml. of solution A. The total volume should be kept as low as possible. Add three times the solution volume of acetone to precipitate the $PbSO_4$. Heat to about 55° C. on a hotplate (avoid open flame). Use glass pearls to prevent bumping and spilling over the edge. Allow to stand for at least 30 minutes. Filter through No. 42 filter paper into a 750 ml. round bottom distillation flask with B-29 neck. Add 2 mm. pearls and 5 mm. pearls. Wash out twice with a solution consisting of: 75% (volume) of acetone, 25% of a 1% perchloric acid solution in distilled water. Distill off acetone on a water-bath. Caution is needed here: when the solution is about to start boiling, tap the flask frequently so that boiling will start *gently* and in order to prevent sudden effervescence of bubbles which could be entrained into the condenser and thus spoil the whole analysis. Residue in the flask: adjust pH to 5.4, add hexamethylenetetramine and indicator, readjust pH and titrate with EDTA (see section 2). This gives the absolute titres of solutions A and B.

(4) *Digested agar and agarose solutions*—First add 10 ml. 4 N NaOH to the sulphur-containing watery solution mentioned in section (a) above, then from a buret run a known amount (i.e. 15.00 ml.) of solution A (excess) and add three times the total volume of acetone. Proceed as described under section 3 (from +). This will give the percentage sulphur. Determine the percentage of moisture of the sample and calculate the sulphur as sulphur percent dry substance. For agar this figure is usually 2–5% and for agarose 0.2–0.4%.

Amounts as small as 0.5 mg. sulphur can be determined by this method.

Accordingly the method is very suitable to show the efficiency of separation achieved by the process in accordance with the invention and to indicate the possible need for modifications of procedure in a plant.

*Example 15.—Separation of agarose from agaropectin, alternative procedure*

60 g. of commercial agar were dissolved in 1000 cc. saline by heating in an autoclave at 105° C. for 30 minutes. After having been dissolved the agar was maintained at 56° C. and to this was added with gentle stirring 1,000 cc. of a 50% solution in saline of polyethylene glycol (molecular weight 6,000). A heavy precipitate was formed which was centrifuged off while the mixture was still warm. The precipitate was redissolved in 1,000 cc. saline by heating to 105° C. and reprecipitated as before. The contaminating polyethylene glycol was removed by stirring the precipitate in chloroform, which dissolved the polyethylene glycol. Yield 85%.

The product was found to have identical properties with agarose prepared by the known acetylation method.

It will be readily appreciated by those skilled in the art that to draw a sharp distinction between true solutions and colloidal dispersions applicable to all ranges of molecular weights of substances referred to in this specification can become difficult if not impossible. In the following claims I shall therefore employ the term "dispersion" in the sense of a condition ranging from true solution to colloidal dispersion.

What I claim is:

1. A process for fractionating a mixture of agarose and agaropectin which comprises:
    (a) bringing said mixture in finely divided form into admixture with polyethylene glycol having a molecular weight of at least 300, there being present also water in which said polyethylene glycol at least after said admixture is in a condition of dispersion ranging from true solution to colloidal dispersion.
    (b) adjusting the relative concentrations in the product of said admixture to a predetermined value at which a part of said mixture is rendered indispersible in the aqueous liquid by the polyethylene glycol, resulting in a flocculated solid phase containing part of said mixture and a single liquid phase containing the remainder of said mixture with a composition different from the initial compoistion of said mixture,
    (c) separating said flocculated solid phase as one fraction from said single liquid phase as a second fraction; and
    (d) recovering a fractionation product of said mixture from at least one of said fractions.

2. The process of claim 1 in which the mixture to be fractionated is first substantially dispersed in the aqueous liquid, whereafter polyethylene glycol is added in an amount predetermined as suitable to precipitate agarose selectively from said mixture.

3. The process of claim 1 in which polyethylene glycol having an average molecular weight in the range 600 to 20,000 is employed.

4. The process of claim 1 carried out with polyethylene glycol having an average molecular weight between 4,000 and 8,000.

5. The process of claim 1 carried out with polyethylene glycol having an average molecular weight between 600 and 1500.

6. A process for fractionating mixtures of agarose and agaropectin which comprises:
    (a) bringing the said mixtures while in aqueous colloidal dispersion, into admixture with polyethylene glycol of sufficient predetermined concentration in relation to its molecular weight to precipitate agarose and at a temperature above the gelling temperature of the colloidal dispersion and below the temperature at which substantial degradation of agarose occurs within the period at which it is subjected to said temperature, thereby (b) producing a precipitate in which the ratio of agarose to agaropectin is higher than in the original mixture and a residual liquid colloidal dispersion in which the ratio of agarose to agaropectin is lower than in the original mixture; and (c) separating the precipitate from the said residual dispersion and recovering at least the precipitate as a product.

7. A process as claimed in claim 6 carried out in the presence of electrolyte during the precipitation of agarose.

8. A process as claimed in claim 6 in which, from the residual colloidal dispersion obtained after the precipitation of agarose an agaropectin product depleted of agarose is recovered and which comprises:
(i) cooling the colloidal dispersion below 20° C.; and
(ii) mixing the dispersion with acetone in a ratio of at the most 2 parts of dispersion per 1 part of acetone to precipitate agaropectin.

9. The process of claim 6 in which the precipitate is washed with aqueous polyethylene glycol.

10. A process as claimed in claim 6 in which fractionated material is freed of polyethylene glycol by solvent extraction.

11. A process as claimed in claim 6 in which the precipitate is subject to repeated dispersion and reprecipitation.

12. A process for fractionating mixtures of agarose and agaropectin which comprises:
(a) bringing the said mixtures, while in aqueous colloidal dispersion, into admixture with polyethylene glycol of sufficient predetermined concentration in relation to its molecular weight to precipitate agarose and at a temperature above 60° C. and below the temperature at which substantial degradation of agarose occurs within the period at which it is subjected to said temperature; thereby
(b) producing a precipitate in which the ratio of agarose to agaropectin is higher than in the original mixture and a residual liquid colloidal dispersion in which the ratio of agarose to agaropectin is lower than in the original mixture; and
(c) separating the precipitate from the said residual dispersion and recovering at least the precipitate as a product.

13. A process as claimed in claim 12 carried out between 70 and 100° C.

14. A process as claimed in claim 13 in which after precipitation and before separation of the precipitate from the said residual dispersion the temperature is allowed to drop to between 60 and 80° C., during which cooling down period the precipitate settles out and assumes a firmer consistency.

15. A process for fractionating mixtures of agarose and agaropectin which comprises:
(a) bringing the said mixtures, while in aqueous colloidal dispersion, too viscous initially for processing at once, into admixture with polyethylene glycol of sufficient predetermined concentration in relation to its molecular weight to precipitate agarose and at a temperature above the gelling temperature of the colloidal dispersion and below the temperature at which substantial degradation of agarose occurs within the period at which it is subjected to said temperature;

(b) after the aforementioned precipitation having resulted in a reduction of viscosity adding further polyethylene glycol until a predetermined final concentration of polyethylene glycol is obtained, said predetermined final concentration being selected for producing a precipitate in which the ratio of agarose to agaropectin is higher than in the original mixture and a residual liquid colloidal dispersion in which the ratio of agarose to agaropectin is lower than in the original mixture; and (c) separating the precipitate from the said residual dispersion and recovering at least the precipitate as a product.

16. A process as claimed in claim 15 in which more concentrated dispersion of said mixture of agarose and agaropectin is added to the reaction mixture and the resulting deficiency of polyethylene glycol is corrected from time to time by the addition of further polyethylene glycol.

17. A process for fractionating mixtures of agarose and agaropectin which comprises:
(a) producing an aqueous colloidal dispersion of said mixture containing in addition at least 0.5% w./v. NaCl and heated to a temperature above the gelling temperature and above 60° C. but below the temperature at which substantial degradation of agarose occurs within the period at which it is subjected to said temperature;
(b) adding solid polyethylene glycol to said dispersion in a predetermined amount adapted to precipitate a predetermined fraction enriched in agarose;
(c) cooling the dispersion and precipitate by at least 10° C.;
(d) filtering off the precipitate;
(e) washing the precipitate with aqueous polyethylene glycol;
(f) redispersing the precipitate and repeating steps (a) to (e) thereon;
(g) shredding the precipitate product of step (f);
(h) washing the shredded product with water; and
(i) drying the washed, shredded precipitate.

References Cited

UNITED STATES PATENTS 2,727,889  12/1955  Alburn _____ 260—209.6
3,115,488  12/1963  Alburn _____ 260—209.6
3,281,409  10/1966  Blethen _____ 260—209

OTHER REFERENCES

Albertsson: "Partition of Cell Particles and Macromolecules," John Wiley & Sons (1960), pp. 116–17.

DONALD E. CZAJA, *Primary Examiner.*

LEON J. BERCOVITZ, *Examiner.*

R. W. MULCAHY, *Assistant Examiner.*